UNITED STATES PATENT OFFICE.

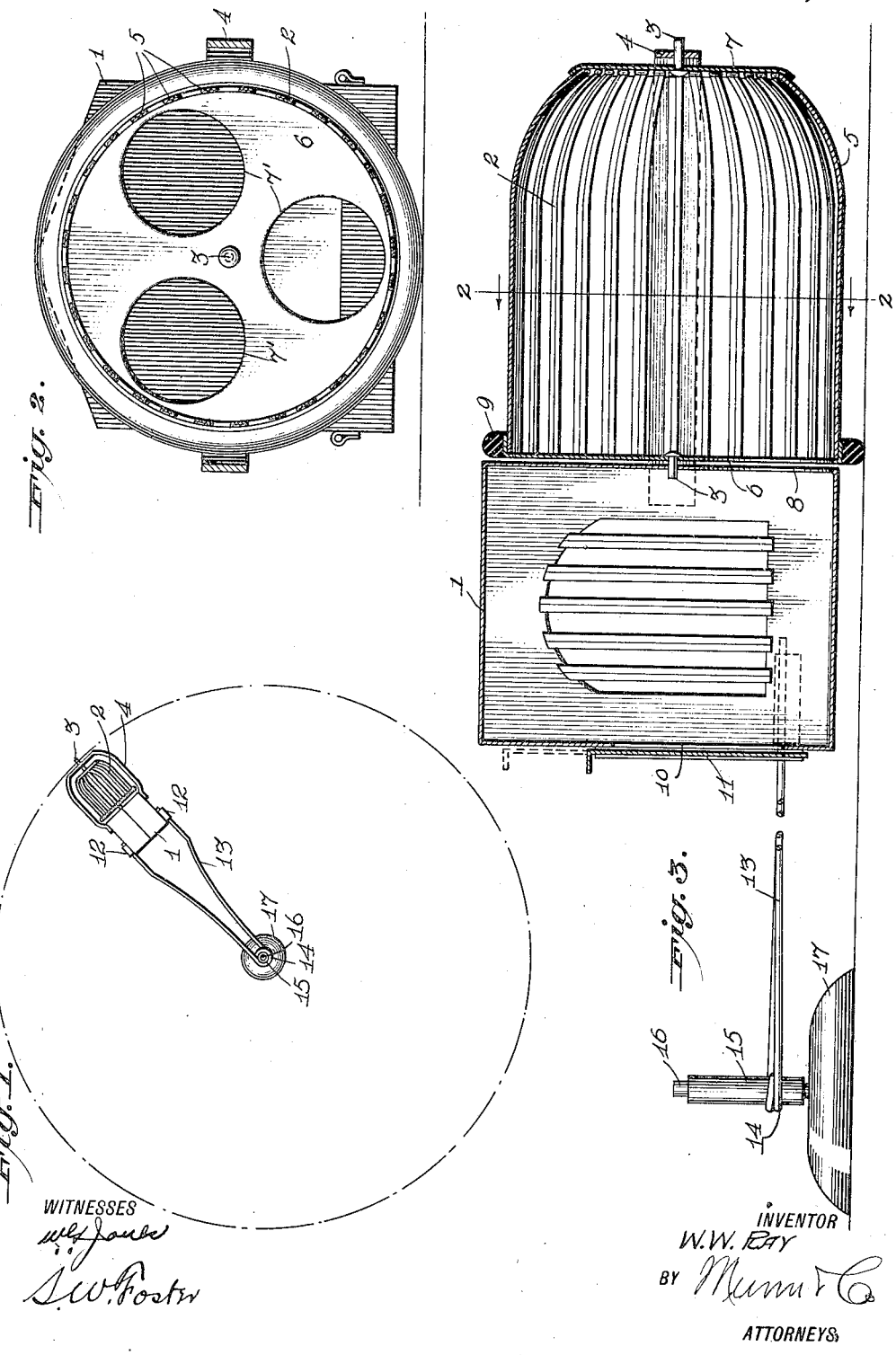

WILLIAM W. RAY, OF LEXINGTON, KENTUCKY.

MOVABLE CAGE.

1,373,350.   Specification of Letters Patent.   Patented Mar. 29, 1921.

Application filed October 26, 1920. Serial No. 419,701.

*To all whom it may concern:*

Be it known that I, WILLIAM W. RAY, a citizen of the United States, and a resident of Lexington, in the county of Fayette and State of Kentucky, have invented a new and Improved Movable Cage, of which the following is a full, clear, and exact description.

This invention relates to improvements in movable cages, and more particularly to a cage which is propelled by the occupant thereof and caused to move in a well-defined path, an object of the invention being to provide a cage of this character which can be used as a means of advertising by placing the same in a store window or other public place and which may be used as an amusement device or for any other purpose.

A further object is to provide a cage of the character stated which is especially adapted for use as a squirrel, rat, or mouse cage, but which, of course, may, in accordance with its size, be used for animals of any size.

With these and other objects in view the invention consists in certain novel features of construction, and combinations and arrangements of parts, as will be more fully hereinafter described and pointed out in the claims.

In the accompanying drawings—

Figure 1 is a plan view illustrating my improved cage in operative position.

Fig. 2 is a view in transverse section on the line 2—2 of Fig. 3.

Fig. 3 is an enlarged view in longitudinal section through the cage.

My improved cage comprises main portions; namely, a house 1 and a rotary cage 2, the latter supported at its ends on trunnions 3, one of said trunnions mounted in the end of the house 1 and the other of said trunnions supported in a frame 4 which is positioned around the outside of the rotary cage 2 and secured to the house 1.

The rotary cage 2 comprises a series of longitudinal bars 5 spaced apart and secured at their inner and outer ends to disks 6 and 7 respectively. The disk 7 is appreciably smaller in diameter than the disk 6 and the outer ends of the bars 5 curve toward the center of the cage for a purpose which will hereinafter appear.

The disk 6 is provided with any desired number of openings 7' which may communicate with an opening 8 in the wall of house 1 to allow the squirrel or other animal to pass from one portion of the cage to the other.

The rotary cage 2 is provided at its end adjacent the house 1 with a circular supporting ring 9. This ring is preferably of rubber fixed snugly around the rotary cage 2 and operates as a cushion tire to support the cage and allow the same to roll over a surface with very little noise.

The house 1 is provided with a doorway 10 normally closed by a door or gate 11 so that the animal may be admitted or escape from the house as may be desired.

On opposite sides of the house 1 I provide sleeves 12 which support the ends of an arm 13 composed preferably of a single piece of wire having its ends secured in the sleeves 12 and its intermediate portion coiled as shown at 14, and secured about a sleeve 15, the latter having rotary mounting on a post 16, said post fixed to a base 17 or secured against movement in any desired manner.

The operation is as follows: When the animal enters the rotary cage 2 and begins to run therein, it will cause said rotary cage to revolve and operate as a wheel, causing the cage to turn in the arc of a circle, as indicated in Fig. 1, with the post 16 as an axis for the turning movement of the cage.

As above stated, the outer ends of the bars 5 comprising the rotary cage 2, are curved toward the center of the cage so as to allow the animal to run on said curved or inclined track and compensate for the centrifugal force occasioned by the movement of the cage in the arc of a circle so that however rapidly the device may be run, the tendency of throwing the animal to the end of the rotary cage is overcome by the inclination of the cage due to said inwardly bent ends of the bars 5.

A device, such as above described, may be located in a store window or other public place and thus attract attention to the store, shop, or to the goods contained therein, and hence, the device may readily serve as an advertising means, but it is, of course, obvious that the invention is not limited to its particular use as this will depend largely upon the size of the device to accommodate the particular animal or animals and may be used as a toy or for any other purpose desired.

Various slight changes might be made in the general form and arrangement of the parts described without departing from the invention, and hence I do not limit myself to the precise details set forth, but consider myself at liberty to make such changes and modifications as fairly fall within the spirit and scope of the appended claims.

I claim:

1. As a new article of manufacture, a movable cage, means operated by the prisoner in the cage for causing the movement of the cage, and means for guiding the movement of the cage in a circular path.

2. A cage of the character described, comprising a rotary cage adapted to be propelled by the prisoner therein, a fixed post, and means connecting the cage and the post, whereby the cage is compelled to move in a circular path with the post as an axis.

3. A cage of the character described, comprising a house, a rotary cage communicating with the house and constituting a support therefor, an arm projecting from the house, and a post providing rotary or pivotal support for the end of the arm, whereby the cage is compelled to move in the arc of a circle about said post.

4. A cage of the character described, comprising a series of longitudinal bars spaced apart, said bars having their outer ends converging, a fixed support, and an arm operatively connecting the cage with the fixed support, whereby the cage is guided in its movement through the arc of a circle around said fixed support.

5. A cage, comprising a house, a rotary cage communicating with the house, a ring around the rotary cage of elastic material providing a cushion support for the rotary cage, an arm connected to the house, a fixed post, and a sleeve connected to the arm and having rotary mounting on the post.

WILLIAM W. RAY.